(12) United States Patent
Dahlheimer et al.

(10) Patent No.: US 8,252,211 B2
(45) Date of Patent: Aug. 28, 2012

(54) DROP PELLETIZING DEVICE AND METHOD FOR THE OPERATION THEREOF

(75) Inventors: Stefan Dahlheimer, Kleinostheim (DE); Stefan Deiss, Harxhaim (DE); Frank Gloeckner, Aschaffenburg (DE); Burkard Kampfmann, Moembris (DE)

(73) Assignee: Automatik Plastics Machinery GmbH, Grossostheim (DE)

(*) Notice: Subject to any disclaimer, the term of this patent is extended or adjusted under 35 U.S.C. 154(b) by 79 days.

(21) Appl. No.: 12/838,380

(22) Filed: Jul. 16, 2010

(65) Prior Publication Data

US 2010/0289166 A1    Nov. 18, 2010

Related U.S. Application Data

(63) Continuation of application No. PCT/EP2009/000042, filed on Jan. 7, 2009.

(51) Int. Cl.
*B29B 9/10* (2006.01)
(52) U.S. Cl. .................... 264/9; 264/13; 264/14; 425/6; 425/10
(58) Field of Classification Search .................. None
See application file for complete search history.

(56) References Cited

U.S. PATENT DOCUMENTS

| | | | | |
|---|---|---|---|---|
| 4,390,484 A | * | 6/1983 | Lombardo et al. | 264/9 |
| 5,500,162 A | * | 3/1996 | Theisen et al. | 264/9 |
| 2002/0182279 A1 | * | 12/2002 | Day | 425/6 |
| 2004/0113300 A1 | * | 6/2004 | Jurgens et al. | 264/9 |

* cited by examiner

*Primary Examiner* — Mary F Theisen
(74) *Attorney, Agent, or Firm* — Buskop Law Group, PC; Wendy Buskop

(57) ABSTRACT

A drop pelletizing device and method for producing pellets from a low-viscosity plastic melt are provided. The drop pelletizing device can include a die plate with holes, in which the plastic melt can be subjected to a harmonic pressure oscillation such that the plastic melt emerging from the holes forms individual pellet droplets, a pressure vessel, in which prevails an overpressure above the ambient pressure, a discharge device adapted to discharge the individual pellet droplets from the pressure vessel and to reduce the overpressure, a separator adapted to separate the individual pellet droplets from the coolant; and at least one circulating device adapted to agitate the coolant to separated and unclump the individual pellet droplets in the coolant and for producing turbulence within the coolant.

19 Claims, 3 Drawing Sheets

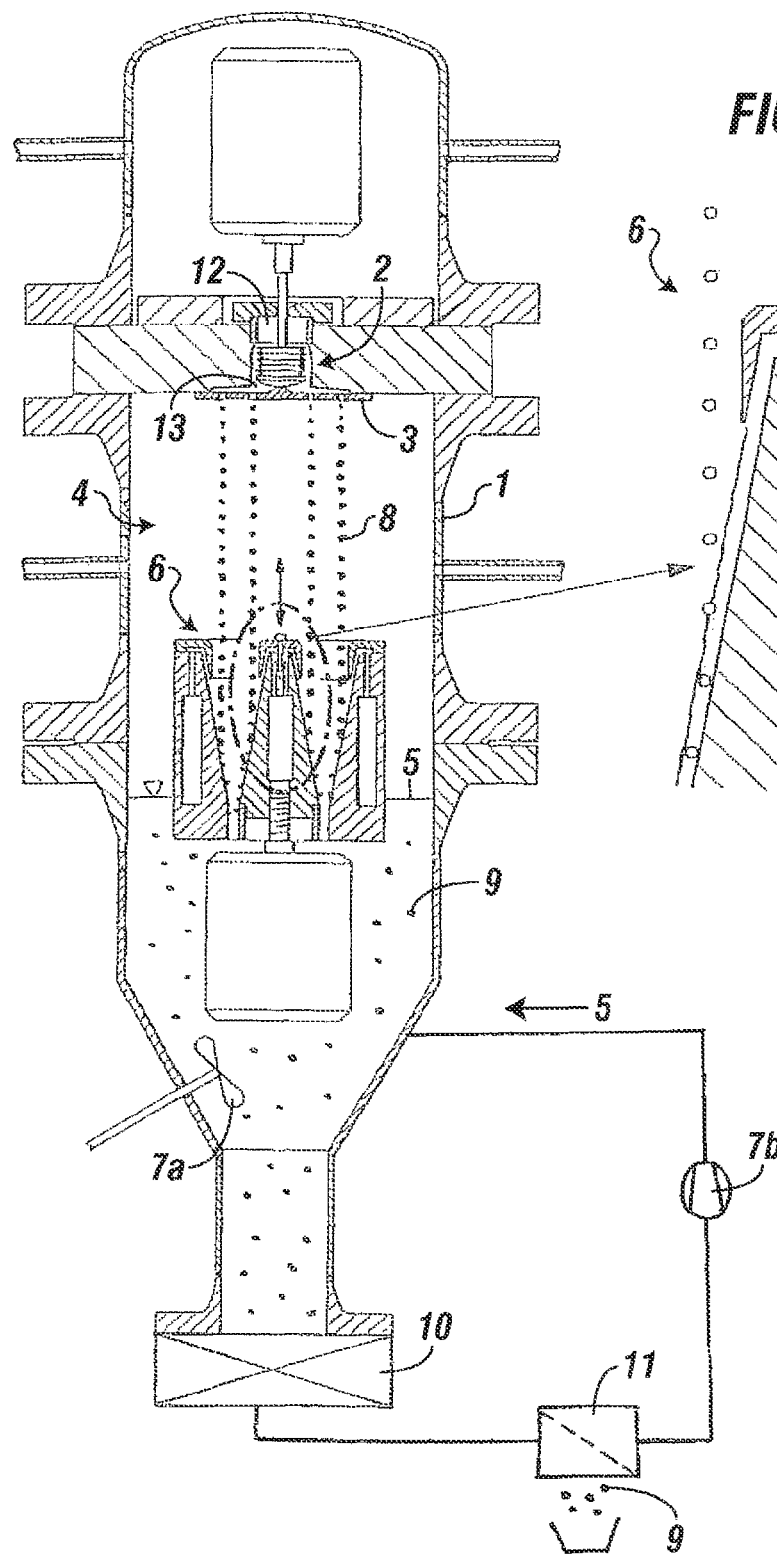
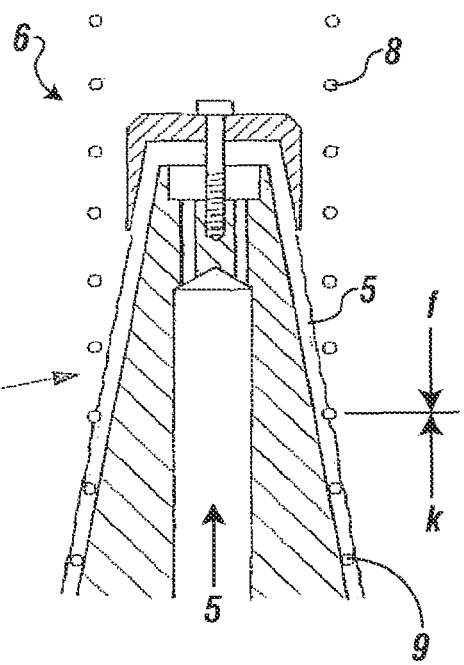
FIGURE 2
FIGURE 3

DROP PELLETIZING DEVICE AND METHOD FOR THE OPERATION THEREOF

CROSS REFERENCE TO RELATED APPLICATIONS

The present patent application is a Continuation Application and claims priority and the benefit of co-pending International Patent Application No. PCT/EP2009/000042 filed Jan. 7, 2009, entitled "DROP PELLETIZING DEVICE AND METHOD FOR THE OPERATION THEREOF," which claims priority to German Patent Application No. DE102008004692.2, which was filed Jan. 16, 2008. These references are incorporated in their entirety herein.

FIELD

The present embodiments generally relate to a drop pelletizing device and a method of operating the same for producing pellets from a low-viscosity plastic melt.

BACKGROUND

A need exists for devices and methods to produce pellets from a low-viscosity plastic melt. Furthermore, a need exists for a device to produce pellets from a low-viscosity plastic melt that avoids foaming of the pellets and falling pellet droplets due to the volatile materials contained in the plastic melt.

A further need exists for methods and devices to produce pellets from a low-viscosity plastic melt that can maintain the pellets in a substantially spherical shape.

In addition, a need exists for methods and devices to produce pellets from a low-viscosity plastic melt that tend to prevent the sticking of the pellets.

The present embodiments meet these needs.

BRIEF DESCRIPTION OF THE DRAWINGS

The detailed description will be better understood in conjunction with the accompanying drawings as follows:

FIG. 2 depicts a schematic side view in partial section of another drop pelletizing device.

FIG. 3 depicts an enlarged detail view from FIG. 2.

FIG. 5B depicts a top view of the collecting device from FIG. 5a.

Figure 1:
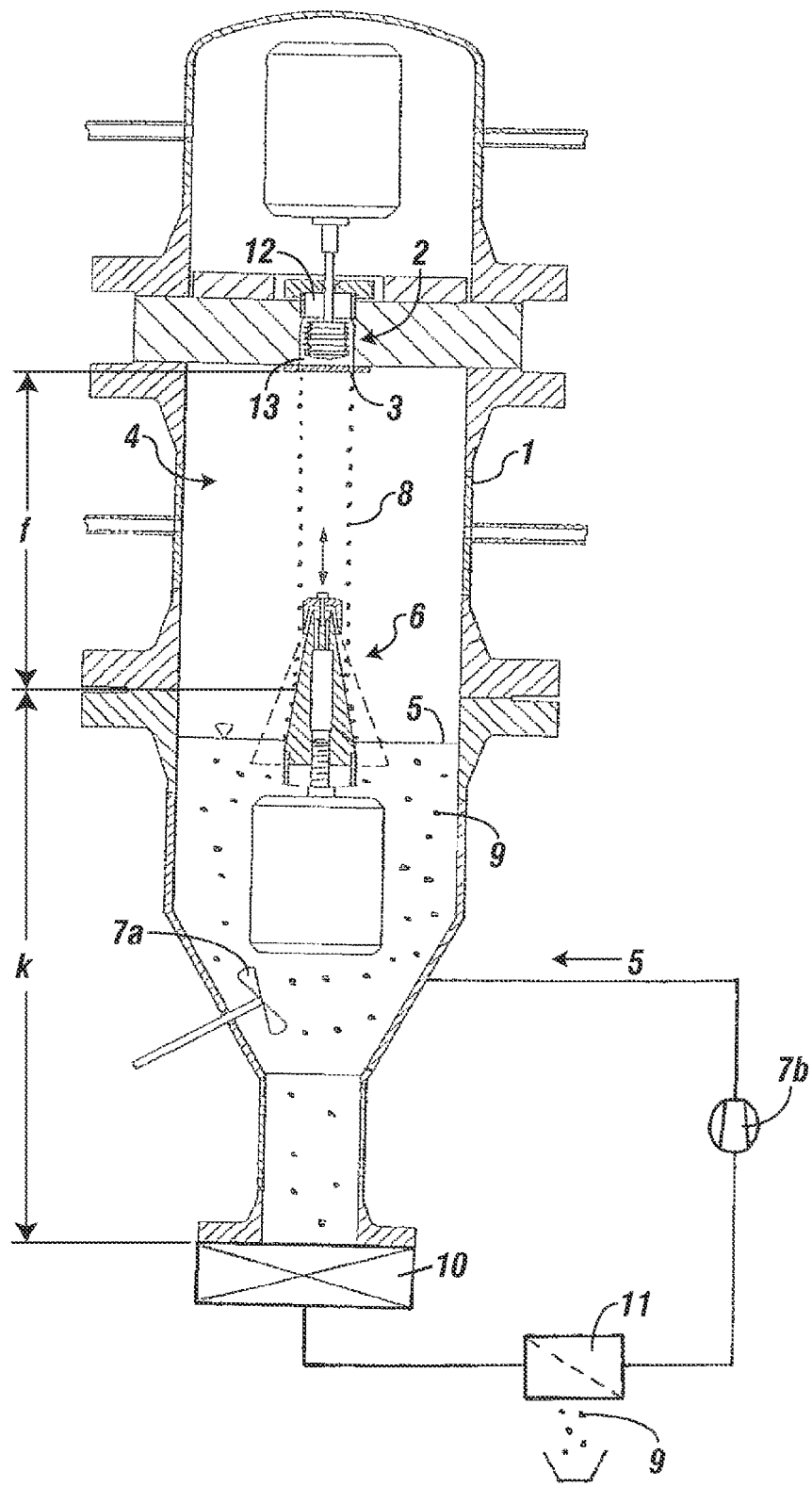
FIG. 1 depicts a schematic side view in partial section of a drop pelletizing device.

The present embodiments are detailed below with reference to the listed Figures.

DETAILED DESCRIPTION OF THE EMBODIMENTS

Before explaining the present device and method of operating the device in detail, it is to be understood that the device and method of operating the device is not limited to the particular embodiments and that it can be practiced or carried out in various ways.

The present embodiments generally relate to a drop pelletizing device and a method of operating the same for producing pellets from a low-viscosity plastic melt.

A drop pelletizing device for producing pellets from a low-viscosity plastic melt can include a die plate with holes. A plastic melt can be subjected to a harmonic pressure oscillation such that the plastic melt emerging from the holes forms individual pellet droplets. The harmonic pressure oscillation can be adjustable such that a maximum deviation of the weight of the pellet droplets is +/−10%.

The die plate can have two concentric circles of holes and a collecting device can have a combination of a truncated cone associated with an inner circle of the concentric holes and a funnel associated with the outer circle of the concentric holes.

A drop pelletizing head can be connected to the die plate such that a maximum pressure difference between the gas space and an equalizing chamber of the drop pelletizing head is less than 5 bar.

A drop forming space of the drop pelletizing head can be adjustable to at least 0.5 bar to 2 bar above the overpressure in the gas space.

The drop pelletizing device can also include a pressure vessel, in which prevails an overpressure above the ambient pressure. The pressure vessel can include a drop section in a gas space. The overpressure in the gas space can be 0.5 bar above the vapor pressure of the volatile substances in the plastic melt. The gas space can be filled with an inert gas.

The pressure vessel can also include a collecting device disposed adjacent to the drop section. The collecting device can provide a velocity drop to individual pellet droplets.

The collecting device can be adjustable in two axes so that the location where the pellet droplets plunge into the coolant is adjustable.

The collecting device can be designed as a truncated cone. The coolant can be directed through an interior thereof to a top surface of the truncated cone and flow down a lateral surface on the outside of the truncated cone.

The collecting device can be designed as a funnel. The coolant can be directed through the interior of the funnel to the funnel rim, and flow down the funnel's surface on the inside.

The collecting device can be adjustable in inclination. The collecting device can be designed as a truncated cone, and an angle of the truncated cone can be adjustable.

The collecting device can also have a curved lateral surface in the shape of an ellipsoid.

The collecting device can be adjustable in height, so that the length of the drop section in the gas space is adjustable.

The pressure vessel can also have a cooling section. The cooling section can be adjacent the collecting device. A coolant can be disposed within the cooling section. The individual pellet droplets can drop into the coolant from the collecting device.

The drop pelletizing device can also include a discharge device adapted to discharge the individual pellet droplets from the pressure vessel and to reduce the overpressure. The discharge device can have a lock, a valve, an impeller lock, the like, or a combination thereof.

The drop pelletizing device can also have a separator adapted to separate the individual pellet droplets from the coolant; and at least one circulating device adapted to agitate the coolant to separate and unclump the individual pellet droplets in the coolant and produce turbulence within the coolant. The circulating device can be located inside the pressure vessel, outside the pressure vessel, or both inside and outside the pressure vessel.

One or more methods for producing pellets by drop pelletizing a low-viscosity plastic melt can be performed using one or more embodiments of the pelletizing device. The method can include discharging at least one melt stream into a pressure vessel through a die plate with holes; imposing a harmonic pressure oscillation on the melt stream to from pellet droplets having an average diameter, wherein the average diameter is determined by a frequency of the imposed harmonic oscillation.

The method can also include forming the pellet droplets in a drop section and plunging the pellet droplets into a coolant.

The method can also include keeping the velocity of the pellet droplets relative to the coolant at the lowest possible velocity as the pellet droplets drop into the coolant; and separating cooled and solidified pellets from the coolant.

FIG. 1 depicts a schematic side view in partial section of a drop pelletizing device.

The drop pelletizing device can have a drop pelletizing head 2 with a die plate 3. The die plate 3 can have holes that are arranged in a circle. The holes can be arranged in other suitable ways, e.g. in sectors.

The plastic melt in the die plate 3 can be subjected to a harmonic pressure oscillation. The harmonic pressure oscillation can allow plastic melt emerging from the holes to form individual pellet droplets 8.

The drop pelletizing head 2 can have an equalizing chamber 12 and a drop forming space 13. The equalizing chamber 12 and the drop forming space 13 can have a specific internal pressure. A maximum pressure difference between a gas space 4 in a pressure vessel 1 of the drop pelletizing device and the equalizing chamber 12 of the drop pelletizing head 2 is less than 5 bar. In one or more embodiments, this pressure can be less than 2 bar. The pressure in the drop forming space 13 of the drop pelletizing head 2 can be adjustable to at least 0.5 bar and to 2 bar above an overpressure above ambient pressure in the gas space 4.

The individual pellet droplets 8 emerging from the holes in the die plate 3 can drop into the gas space 4 of the pressure vessel 1. The pressure vessel 1 can provide an overpressure above the ambient pressure. The pressure vessel 1 can include a drop section (f) in the gas space 4 and a cooling section (k) with a coolant 5. The individual pellet droplets 8 can move through the drop section (f) and into the coolant 5. The overpressure in the pressure vessel 1 can be set at least as high as the vapor pressure of the volatile substances contained in the plastic melt or as high as the vapor pressure of the water contained therein.

After falling through the drop section (f), the individual pellet droplets 8 can strike a collecting device 6. The collecting device 6 can reduce the velocity of the individual pellet droplets 8. Accordingly, the individual pellet droplets 8 can have the lowest possible velocity relative to the coolant 5 at the location where they plunge into the coolant 5. The collecting device 6 can be a truncated cone, and the coolant 5 can be directed through the interior thereof. For example, the coolant fluid can flow from a top surface of the collecting device 6 to a lateral surface on the outside of the collecting device 6. The collecting device 6 can be located in the pressure vessel 1. Furthermore, the collecting device 6 can be selectively sealed. For example, the collecting device 6 can be located in the pressure vessel 1 and can be sealed off from the pressure vessel 1 during the operation of the device.

Hence, after falling through the drop section (f), the individual pellet droplets 8 can enter the coolant 5 by flowing down the outside of the lateral surface of the collecting device 6, which can have the truncated cone-shape.

The lower region of the collecting device 6, which can have the truncated-cone-shape, can be located in a bath of the coolant 5. The pellets 9 can be conveyed further downward in the coolant 5 by the coolant 5 flowing down the lateral surface on the outside of the collecting device 6 into the bath of coolant 5.

A circulating device 7a for the coolant 5 can be disposed inside the pressure vessel 1 and another circulating device 7b can be disposed outside of the pressure vessel 1. The circulating devices 7a and 7b can agitate the coolant 5 to separate the pellets 9 or the individual pellet droplets 8. The pellets 9 or individual pellet droplets 8 can be discharged from the pressure vessel 1.

In one or more embodiments, one or more circulating devices can be disposed in the interior of the pressure vessel 1, such as circulating device 7a, or outside the pressure vessel 1, such as circulating device 7b. This can be determined in accordance with the geometric and/or flow conditions of the individual case, wherein optimal circulation as discussed above can then occur in accordance with the invention.

A circulating pump or similar item may serve as the circulating device. In the case of a circulating device located outside of the pressure vessel 1, the circulating device can be connected to the pressure vessel 1 through a coolant supply line.

A discharge device 10 can be used to discharge the pellets 9 from the pressure vessel 1 and the overpressure can be reduced. A separator 11 can separate the pellets 9 from the coolant 5. Optional downstream conveying and/or storage devices may be provided for storage or further processing of the pellets 9.

The pellets 9 in the coolant 5 can be discharged out of the pressure vessel 1 by the discharge device 10 and separated from the coolant 5 by the separator 11; however, it may also be the case that the pellets 9 can first be separated from the coolant 5 by the separating device 11 and then can be discharged out of the pressure vessel 1 by the discharge device 10, and the overpressure can be reduced as appropriate. This can be accomplished by a cellular wheel sluice or similar means, for example.

The gas space 4 can be filled with an inert gas, for example with nitrogen.

The cooling section (k) can be composed of the section extending from the point where the collecting device 6 is struck, while the bath with coolant 5 can extend to the foot region of the pressure vessel 1.

The entire inventive drop pelletizing device with drop section (f) and cooling section (k) can be provided in the pressure vessel 1 in a vertical arrangement one below the other, by which means the required space—specifically with respect to the arrangement with or in the pressure vessel 1—can be made as compact as possible and can also be kept simple in terms of measurements.

The collecting device 6 can be adjustable in two axes such that the location where the pellet droplets plunge into the coolant 5 is adjustable. In one or more embodiments, the collecting device 6 can be adjustable in two axes and lockable. The adjustment can take place along the two horizontal spatial axes. The entire collecting device 6 can also adjustable in height along the vertical spatial axis, as is also indicated by the double arrow in FIG. 1. In this way, individual adaptability to different materials to be drop pelletized and/or adjustability of the length of the drop section (f) in the gas space 4 can easily be provided in the interior of the pressure vessel 1 in accordance with the invention.

The length of the drop section (f) in the gas space 4 can be adjustable in such a manner that the individual pellet droplets 8 can be shaped with a spherical or essentially spherical shape before they plunge into the coolant 5.

FIG. 2 shows, in a schematic side view in partial section, an inventive drop pelletizing device according to a second embodiment of the present invention.

Here, as elsewhere, identical reference symbols in FIG. 2 correspond to identical elements such as have already been described for FIG. 1. The embodiment in FIG. 2 corresponds largely to the embodiment in FIG. 1, and differs therefrom primarily in that two concentric circles or two correspondingly arranged sections/segments of holes are provided in the die plate 3.

The collecting device 6 can include a combination a truncated cone associated with the inner circle/segment, and a funnel associated with the outer circle/segment. It can be noted that if applicable, a collecting device 6 that is designed as a truncated cone (see FIG. 1), and/or a collecting device 6 designed as a funnel, may be provided (while this embodiment is not explicitly shown, it results when the inner truncated cone and inner circle in the depiction in FIG. 2 are omitted).

In the funnel of the collecting device 6 as shown in FIG. 2, the coolant 5 can be directed through its interior to its funnel rim, and then runs downward inside on its funnel surface.

FIG. 3 schematically shows an enlarged detail of the collecting device 6 in the region of the truncated cone from FIG. 2. Clearly visible here is the way the individual pellet droplets 8 strike the coolant 5 and plunge into the coolant 5 after they have passed through the drop section (f). It can also be seen that the drop section (f) is sufficiently long for spherical or essentially spherical individual pellet droplets 8, and hence also pellets 9, to be able to form. The coolant 5 can be conveyed upward in the interior of the truncated-cone-shaped collecting device 6. The truncated-cone-shaped collecting device 6 can be deflected by a cap that defines a gap between itself and the lateral surface. The coolant 5 can run downward on the lateral surface of the truncated cone. This also applies similarly for the outer surrounding funnel, which can be seen in FIG. 2. The coolant 5 can be guided through the funnel's interior to its funnel rim and flow through a circumferential cap and downward inside on its funnel surface. However, this detail is not explicitly shown again in FIG. 3.

Figure 4:
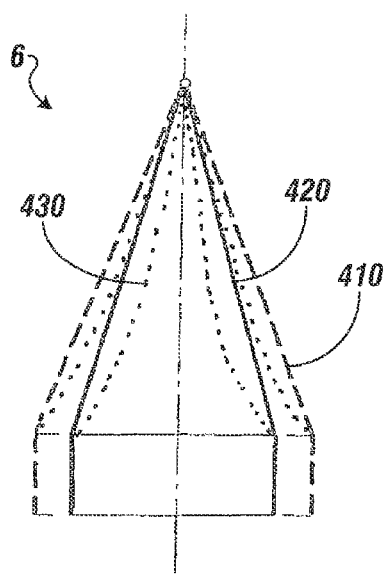
FIG. 4 depicts a schematic view of a collecting device for a drop pelletizing device.

FIG. 4 shows a collecting device 6 of the inventive drop pelletizing device in the form of a truncated cone, showing different angles of the truncated cone. A truncated cone with a more acute angle is drawn with a continuous line 420, and a truncated cone with a more obtuse cone angle is shown with a dashed line 410.

The dotted lines 430 depict the collecting device 6 that can have a curved lateral surface, in the shape of an ellipsoid. In one or more embodiments, the truncated cone can have a concave curvature.

Similarly, the inner funnel surface of the funnel of the collecting device 6 (see FIG. 2) can be correspondingly angled and/or curved; however, this is not explicitly shown in FIG. 4.

Figure 5A:
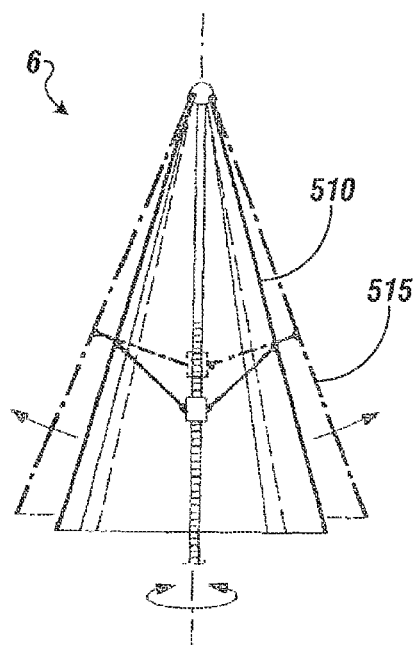
FIG. 5A depicts a schematic side view of another collecting device of a drop pelletizing device.
Figure 5B:
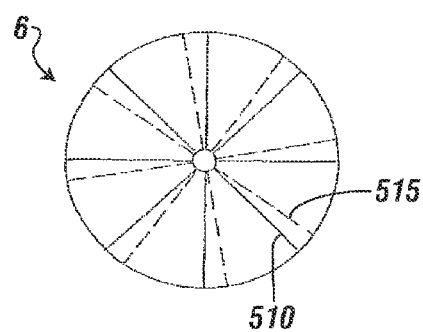

FIGS. 5A and 5B each use solid lines 510 to show the setting of the collecting device 6 in the form of a truncated cone at a more acute angle of the truncated cone. The setting with a more obtuse angle is shown in dotted/dashed lines 515 in each case.

It should be noted that the adjustability of a collecting device 6 in the form of a funnel can be designed in a manner similar to the case of a collecting device 6 in the form of a truncated cone shown in FIGS. 5A and 5B.

FIG. 5A schematically shows an embodiment of the collecting device 6 in the form of a truncated cone, in which the lateral surface of the truncated cone, and thus the angle setting of the truncated cone, are adjustable by means of a hinge mechanism in the upper part of the truncated cone. Hinged elements can be variable in their angles via hinged attachments through the turning of a threaded rod and a nut running thereon.

FIG. 5B shows a top view of the angle-adjustable collecting device 6 in the form of a truncated cone from FIG. 5A.

The drop pelletizing device can also be used to carry out the process according to the invention.

While these embodiments have been described with emphasis on the embodiments, it should be understood that within the scope of the appended claims, the embodiments might be practiced other than as specifically described herein.

What is claimed is:

1. A drop pelletizing device for producing pellets from a low-viscosity plastic melt, wherein the drop pelletizing device comprises:
   a. a die plate with holes, in which a plastic melt can be subjected to a harmonic pressure oscillation such that the plastic melt emerging from the holes forms individual pellet droplets;
   b. a pressure vessel, in which prevails an overpressure above an ambient pressure, wherein the pressure vessel comprises:
      (i) a drop section in a gas space;
      (ii) a collecting device disposed adjacent to the drop section, wherein the collecting device provides a velocity drop to the individual pellet droplets; and
      (iii) a cooling section adjacent the collecting device, wherein a coolant is disposed within the cooling section, and wherein the individual pellet droplets drop into the coolant from the collecting device;
   c. a discharge device adapted to discharge the individual pellet droplets from the pressure vessel and to reduce the overpressure;
   d. a separator adapted to separate the individual pellet droplets from the coolant; and
   e. at least one circulating device adapted to agitate the coolant to separate and unclump the individual pellet droplets in the coolant and produce turbulence within the coolant.

2. The drop pelletizing device of claim 1, wherein the at least one circulating device is located inside the pressure vessel.

3. The drop pelletizing device of claim 1, wherein the at least one circulating device is located outside of the pressure vessel.

4. The drop pelletizing device of claim 1, wherein the collecting device is adjustable in two axes so that a location where the individual pellet droplets plunge into the coolant is adjustable.

5. The drop pelletizing device of claim 2, wherein the collecting device is adjustable in two axes so that a location where the individual pellet droplets plunge into the coolant is adjustable.

6. The drop pelletizing device of claim 2, wherein the collecting device is designed as a truncated cone, with the coolant being directed through an interior thereof to a top surface of the truncated cone and flowing down a lateral surface on an outside of the truncated cone.

7. The drop pelletizing device of claim 1, wherein the collecting device is designed as a truncated cone, with the coolant being directed through an interior thereof to a top surface of the truncated cone and flowing down a lateral surface on an outside of the truncated cone.

8. The drop pelletizing device of claim 1, wherein the collecting device is designed as a funnel, with the coolant being directed through the collecting device's interior to a funnel rim, and flowing down the collecting device's funnel surface on the inside.

9. The drop pelletizing device of claim 1, wherein the die plate comprises two concentric circles of holes, and wherein the collecting device comprises a combination of a truncated cone associated with an inner circle of the concentric circles of holes and a funnel associated with an outer circle of the concentric circles of holes.

10. The drop pelletizing device of claim 1, wherein the collecting device is adjustable in inclination.

11. The drop pelletizing device of claim 1, wherein the collecting device is designed as a truncated cone, and wherein an angle of the truncated cone is adjustable.

12. The drop pelletizing device of claim 1, wherein the collecting device has a curved lateral surface in a shape of an ellipsoid.

13. The drop pelletizing device of claim 1, wherein the collecting device is adjustable in height, so that a length of the drop section in the gas space is adjustable.

14. The drop pelletizing device of claim 1, further comprising a drop pelletizing head connected to the die plate such that a maximum pressure difference between the gas space and an equalizing chamber of the drop pelletizing head is less than 5 bar.

15. The drop pelletizing device of claim 14, wherein the pressure in a drop forming space of the drop pelletizing head is adjustable to at least 0.5 bar to 2 bar above the overpressure in the gas space.

16. The drop pelletizing device of claim 1, wherein the overpressure in the gas space is 0.5 bar above a vapor pressure of volatile substances in the plastic melt.

17. The drop pelletizing device of claim 1, wherein a frequency of the harmonic pressure oscillation is adjustable such that a maximum deviation of the individual pellet droplets is +/−10%.

18. The drop pelletizing device of claim 1, wherein the discharge device has a lock, a valve, an impeller lock, or a combination thereof.

19. A method for producing pellets by drop pelletizing a low-viscosity plastic melt, wherein the method comprises:
   a. discharging of at least one melt stream into a pressure vessel in which prevails an overpressure above an ambient pressure through a die plate with holes;
   b. imposing a harmonic pressure oscillation on the melt stream to form pellet droplets having an average diameter, wherein the average diameter is determined by a frequency of the imposed harmonic oscillation;
   c. forming the pellet droplets in a drop section;
   d. plunging the pellet droplets into a coolant, and keeping a velocity of the pellet droplets relative to the coolant at the lowest possible velocity as the pellet droplets drop into the coolant; and
   e. separating cooled and solidified pellets from the coolant.

\* \* \* \* \*